United States Patent [19]

Kirchmeyer et al.

[11] Patent Number: 5,539,024

[45] Date of Patent: Jul. 23, 1996

[54] RESINS CONTAINING PERFLUOROALKYL GROUPS AND THEIR USE

[75] Inventors: Stephan Kirchmeyer, Leverkusen; Klaus Pohmer, Köln, both of Germany

[73] Assignee: Bayer Aktiengesellschaft, Leverkusen, Germany

[21] Appl. No.: 444,602

[22] Filed: May 19, 1995

[30] Foreign Application Priority Data

May 26, 1994 [DE] Germany .......................... 44 18 309.7

[51] Int. Cl.⁶ .............................. C08K 3/20; C08L 63/02
[52] U.S. Cl. .......................... 523/404; 428/290; 428/473; 428/481; 428/537.5; 528/119; 564/96; 252/8.57; 252/8.62
[58] Field of Search ............................ 523/404; 528/119; 564/80, 95, 96; 252/DIG. 1, 8.6, 8.75, 8.8, 8.9; 428/290, 473, 481, 537.5

[56] References Cited

U.S. PATENT DOCUMENTS

| | | |
|---|---|---|
| 2,915,554 | 12/1959 | Ahlbrecht et al. ............ 564/96 |
| 3,297,519 | 1/1967 | Rambosek . |
| 3,906,027 | 9/1975 | Mcussdoerffer et al. . |
| 4,265,831 | 5/1981 | Mitschke et al. ............ 564/96 |
| 4,353,834 | 10/1982 | Langdon .................... 564/82 |
| 5,039,739 | 8/1991 | Padget et al. . |
| 5,247,008 | 9/1993 | Michels et al. . |
| 5,324,763 | 6/1994 | Rossler et al. . |
| 5,346,949 | 9/1994 | Fukazawa . |
| 5,372,731 | 12/1994 | Michels et al. . |

FOREIGN PATENT DOCUMENTS

| | | |
|---|---|---|
| 0125826 | 11/1984 | European Pat. Off. . |
| 0311894 | 4/1989 | European Pat. Off. . |
| 0533159 | 3/1993 | European Pat. Off. . |
| 0552630 | 7/1993 | European Pat. Off. . |
| 2194739 | 1/1974 | France . |
| 1620965 | 5/1970 | Germany . |

OTHER PUBLICATIONS

Database WPI, Week 8510, Derwent Publications Ltd., London, GB; AN 85–059894 & JP–A–60 017 197 (Toyo Shigyo KK), Jan. 29, 1985.
Abstract of European Pat. Application No. 95107321.2, Oct. 1995.
C. Martens, Alkyd Resins, pp. 51–59, Reinhold Publ. Corp. (1961).
E. Muller in Houben–Weyl, Methods of Organic Chemistry, Col 14/2 pp. 1–5, 21–23, 40–44 (1963).

*Primary Examiner*—Melvyn I. Marquis
*Assistant Examiner*—D. Aylward
*Attorney, Agent, or Firm*—Sprung Horn Kramer & Woods

[57] ABSTRACT

This invention relates to resins which contain perfluoroalkyl groups and which are soluble, emulsifiable or dispersible in water, and to their use as treatment-, protective- and impregnating media for mineral materials, textile materials and paper, and as emulsifying, crosslinking and auxiliary processing materials for the production of aqueous preparations containing perfluoroalkyl compounds.

8 Claims, No Drawings

RESINS CONTAINING PERFLUOROALKYL GROUPS AND THEIR USE

The present invention relates to resins which contain perfluoroalkyl groups and which are soluble, emulsifiable or dispersible in water, and to their use as treatment-, protective- and impregnating media for mineral materials, textile materials and paper, and as emulsifying, crosslinking and auxiliary processing materials for the production of aqueous preparations containing perfluoroalkyl compounds.

Due to their surface tension, compounds containing perfluoroalkyl groups exhibit outstanding properties in terms of water- and dirt-repellency. In addition, hydrophilically modified perfluoroalkyl compounds have a high surface activity. Because of their film-forming properties, polymeric compounds or resins provide advantages as regards their water- and dirt-repellent properties. Compounds, polymers or resins containing perfluoroalkyl groups are preferably applied in the form of solvent-free, aqueous solutions, dispersions or emulsions.

The preparation of aqueous polyurethane polymers containing perfluoroalkyl groups or perfluoropolyethers by the reaction of hydroxyfunctional perfluoroalkyl components, isocyanates and ionic or nonionic components, and the synthesis of acrylate-based polymers containing perfluoroalkyl groups which are either produced as aqueous dispersions or can easily be converted into aqueous dispersions is known from a whole series of documents (e.g. EP-A 491,248, EP-A 533,159, EP-A 552,630, EP-A 572,269, EP-A 560,161, U.S. Pat. No. 5,039,739). The components containing perfluoroalkyl chains which are described in these documents and which are used for the synthesis of polymers or resins, contain functional hydroxyl or amino groups which can react with isocyanates, or unsaturated groups which can be converted to polymers by radical polymerization or by ionic initiation methods.

Perfluoroalkyl sulphonamides or N-alkyl perfluoroalkyl sulphonamides which are available on a commercial scale cannot be used for the production of the abovementioned polymers or resins based on polyurethane or polyacrylate chemistry, since they do not have the correspondingly required functionality, i.e. they cannot be reacted either with isocyanate groups, by radical polymerization or by employing ionic initiation methods to form polymers or resins. Perfluoroalkyl sulphonamides and N-alkyl perfluoroalkyl sulphonamides are prepared by the electrolytic fluorination of alkylsulphonic acids, whereby primary perfluoroalkylsulphonyl fluorides are obtained which are reacted with ammonia or alkylamines to form the corresponding perfluoroalkyl sulphonamides and N-alkylperfluoroalkyl sulphonamides, respectively, as the primary available perfluoroalkyl components. The perfluoroalkyl sulphonamides and N-alkylperfluoroalkyl sulphonamides prepared in this manner therefore have to be converted via further derivative-forming reactions into the corresponding hydroxyl or amino-functional compounds or into compounds which contain unsaturated groups, for example.

However it would be desirable, particularly for reasons of cost, to be able to react perfluoroalkyl sulphonamides or N-alkylperfluoroalkyl sulphonamides directly to form compounds, polymers or resins containing perfluoroalkyl groups without the formation of further, expensive fluorine-containing components. In particular, it would be very advantageous commercially if polymers or resins with the properties of solubility, emulsifiability or dispersibility in water could be produced directly from these components.

The object of the present invention is therefore to provide compounds which are soluble, emulsifiable or dispersible in water, which can be produced simply and inexpensively and which have the requisite properties such as water- and dirt-repellency.

Surprisingly, it has now been found that resin-like or polymer-like reaction products can be produced by the direct reaction of sulphonamides containing perfluoroalkyl groups with compounds containing 1,2-epoxides under mild conditions. Furthermore, it has been found that when compounds containing oxyethylene units are used in addition, resins which are soluble, emulsifiable or dispersible in water can be obtained which are suitable as treatment and coating media for textiles, leather, paper and mineral materials.

In addition, these resins are suitable as emulsifying agents for perfluoroalkyl alkoxysilanes. This is all the more surprising since it has hitherto not been possible to emulsify perfluoroalkoxysilanes either using conventional emulsifying agents or by means of known, fluorine-containing surfactants.

The present invention relates to resins which contain perfluoroalkyl groups and which are water-soluble or emulsifiable or dispersible in water, and which can be produced from a) one or more sulphonamides containing perfluoroalkyl groups of general formula (I)

where $R^f$ represents a monovalent perfluoroalkyl group with 4 to 20 carbon atoms, and $R^1$ represents hydrogen or a monovalent hydrocarbon chain with 1 to 20 carbon atoms, optionally interrupted by 1 to 4 oxygen atoms, b) a component which contains oxyethylene units and which contains groups which react with 1,2-epoxides, c) a component which contains 1,2-epoxide groups, and d) optionally additional components which contain groups which react with 1,2-epoxides, with the proviso that the amount of oxyethylene units present in the resin is 5 to 95 weight % of the total resin.

Particularly preferred resins which contain perfluoroalkyl groups and which are soluble, emulsifiable or dispersible in water are those which contain 5 to 95 weight % of oxyethylene units, calculated based on an equivalent weight of 44 g/mole oxyethylene unit, 1.5 to 60 weight % of fluorine and optionally up to 200 milliequivalents of ionic groups per 100 g of resin.

Particularly preferred resins which contain perfluoroalkyl groups and which are soluble, emulsifiable or dispersible in water are those in which the equivalent ratio of the epoxide groups of the component containing 1,2-epoxide groups to the groups of the other components which react with epoxide groups is between 1 to 5 and 5 to 1.

Preferred resins which contain perfluoroalkyl groups and which are soluble, emulsifiable or dispersible in water are also those which are characterized in that a polyoxyalkylene-modified polyester which comprises oxyethylene units and contains acidic groups is used as component b).

The resins which contain perfluoroalkyl groups and which are soluble, emulsifiable or dispersible in water are preferably used as treatment-, protective- and impregnation media for mineral materials, textile materials, leather and paper, and as emulsifying, crosslinking and auxiliary processing agents for the production of aqueous preparations containing perfluoroalkyl compounds.

The $R^f$ radical of the sulphonamides according to formula (I) is a monovalent perfluoroalkyl group with 4 to 20 carbon atoms, e.g. straight-chain or branched perfluorobutane, perfluoropentane, perfluorohexane, perfluoroheptane, perfluorooctane, perfluorononane, perfluorodecane or perfluorododecane groups, preferably perfluorobutane and perfluorooctane groups. The $R^1$ group is hydrogen or a monovalent organic group, preferably a monovalent, aliphatic group with 1 to 20 carbon atoms, optionally interrupted by 1 to 4 oxygen atoms, e.g. methyl, ethyl, propyl, butyl or 1-methylethyl groups, preferably methyl or ethyl groups.

Examples of suitable compounds of general formula (I) comprise N-methyl-1-perfluorobutane sulphonamide, N-ethyl-1-perfluorobutane sulphonamide, N-propyl-1perfluorobutane sulphonamide, N-methyl-1-perfluoropentane sulphonamide, N-ethyl- 1-perfluoropentane sulphonamide, N-methyl-1-perfluorohexane sulphonamide, N-ethyl-1-perfluorohexane sulphonamide, N-propyl-1-perfluorohexane sulphonamide, N-methyl-1-perfluoroheptane sulphonamide, N-ethyl- 1-perfluoroheptane sulphonamide, N-butyl-1-perfluoroheptane sulphonamide, N-methyl-1-perfluorooctane sulphonamide, N-ethyl-1-perfluorooctane sulphonamide, N-1-methylethyl-1-perfluorooctane sulphonamide, N-butyl-1-perfluorooctane sulphonamide, N-ethyl-1-perfluorononane sulphonamide, N-propyl-1-perfluorodecane sulphonamide, N-propyl-1-perfluorododecane sulphonamide, perfluorobutane sulphonamide, perfluorohexane sulphonamide and perfluorooctane sulphonamide.

Component b) contains at least one mono-, di- and/or polyfunctional compound, which contains oxyethylene units ($-CH_2-CH_2-O-$) calculated with an equivalentweight of 44 g/mole oxyethylene unit and which comprises groups which react with 1,2-epoxides. Examples of functional groups such as these comprise functional carboxylic acid or amino groups, and functional thiol or hydroxyl groups, the latter two being less preferred. Functional hydroxyl groups in particular react with 1,2-epoxides only under extreme conditions, i.e. using strong bases as catalysts or at high temperatures. It is also preferable to convert functional hydroxyl groups into functional carboxyl groups; this can easily be achieved by reaction of the functional hydroxyl groups with dicarboxylic acids or with their reactive derivatives, such as esters or anhydrides, for example. By this means compounds with functional carboxyl groups are obtained which readily react with 1,2-epoxide groups.

Polyethers of the type known in the art which contain at least one, preferably two to three, hydroxyl groups may be used as hydroxyfunctional compounds, for example. These can be prepared by the polymerization of epoxides such as ethylene oxide, and additionally propylene oxide, butylene oxide or other 1,2-epoxides, e.g. in the presence of Lewis catalysts such as $BF_3$, or by the addition of these epoxides, preferably of ethylene oxide and propylene oxide, optionally in admixture or successively, to starting compounds containing reactive hydrogen atoms, such as butanol, ethoxybutanol, water, alcohols, ammonia or amines, e.g. ethylene glycol, (1,2)- or (1,3)-propylene glycol, glycerine, sorbitol, 2.2-bis-(4-hydroxyphenyl)-propane, aniline, ethanolamine or ethylenediamine.

In order to convert the functional hydroxyl groups into functional carboxylic acid groups, e.g. by esterification of the polyethers described above, these are reacted with dicarboxylic acids or their esterifiable derivatives, optionally in admixture with further monohydric, dihydric or polyhydric alcohols and option ally with monocarboxylic acids in the manner known in the art (see Houben-Weyl, Methoden der Organischen Chemie [Methods of Organic Chemistry], Stuttgart, 1963, Volume 14/2, pages 1–5, 21–23, 40–44; C. Martens, Alkyd Resins, Reinhold Publ. Corp. 1961, Reinhold Plastics Appl. Ser., pages 51–59) so that an excess of unesterified acidic groups remains. Esterification is preferably carried out down to acid numbers of 5 to 200, most preferably 30 to 100, mg KOH/g substance. The polyesters concerned are therefore preferably those comprising oxyethylene units and containing acidic groups. Examples of further alcohols include ethylene glycol, (1,2)- and (1,3)-propylene glycol, (1,4)- and (2,3)-butylene glycol, (1,6)-hexanediol, (1,8)-octanediol, neopentyl glycol, 1,4-bis(hydroxymethyl)cyclohexane, 2-methyl-1,3-propanediol, glycerine, trimethylolpropane, diethylene glycol, triethylene glycol, tetraethylene glycol and higher polyethylene glycols, dipropylene glycol and higher polypropylene glycols, and dibutylene glycol and higher polybutylene glycols. The following should be cited as examples of dicarboxylic acids and their derivatives: succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimerized and trimerized unsaturated fatty acids, optionally in admixture with monomeric unsaturated fatty acids, terephthalic acid dimethyl ester and terephthalic acid bisglycol ester.

Compounds of the above-mentioned type containing oxyethylene units which have been made functional by vinyl polymerization are also suitable as component b), e.g. compounds containing oxyethylene groups grafted with acrylic acid, methacrylic acid, maleic acid, fumaric acid, or itaconic acid. Also suitable for grafting are derivatives which can subsequently be converted into the carboxylic acids, such as acrylic acid esters, methacrylic acid esters or maleic anhydride, for example.

Polyethers comprising terminal amino groups and containing oxyethylene groups may also be used, for example those which are obtainable by the reductive amination of the polyethers containing oxyethylene groups described above.

It is important that the compounds of component b) have functional groups which can react with 1,2-epoxides and that the oxyethylene units are present in an amount such that the resin has a content of 5 to 95 weight % of oxyethylene units, preferably 8 to 25 weight % of oxyethylene units.

The basic structures of the compounds contained in component c), which comprise 1,2-epoxide groups, have 1 to 45 C atoms and constitute epoxidizable di- or polyphenols, di- or polycarboxylic acids, di- or polycarboxylic acid anhydrides, di-or polyhydric alcohols or compounds which are at least doubly unsaturated.

Examples of these include diglycidyl ethers of dihydric phenols, such as catechol, resorcinol, hydroquinone, 2,2-bis-(4-hydroxyphenyl)-propane, 2,2-bis-(4-hydroxy- 3-methyl)-propane, 4,4'-dihydroxydiphenylsulphone, glycidyl esters of divalent aromatic, aliphatic and cycloaliphatic carboxylic acids, such as phthalic anhydride bisglycidyl esters or adipic acid bisglycidyl ester for example, or glycidyl ethers of dihydric aliphatic alcohols such as butanediol bisglycidyl ether, hexanediol bisglycidyl ether or polyoxyalkylene glycol bisglycidyl ether.

Examples of compounds containing more than two epoxide groups include: polyglycidyl ethers of polyhydric phenols, for example of novolacs (reaction products of monohydric or polyhydric phenols with aldehydes, particularly formaldehyde, in the presence of acid catalysts), tris- (4-hydroxyphenyl)methane or 1,1,2,2-tetra(4-hydroxyphenyl)ethane; epoxide compounds based on aromatic amines and epichlorohydfin, for example tetraglycidyl methylene dianiline, N-di-epoxypropyl- 4-aminophenyl glycidyl ether; glycidyl esters of polyvalent aromatic, aliphatic and cycloaliphatic carboxylic acids; glycidyl ethers of polyhydric alcohols, for example of glycerine, trimethylolpropane and pentaerythritol, and other glycidyl compounds such as trisglycidyl isocyanurate.

Glycidyl ethers of dihydric or polyhydric phenols are preferred; bisglycidyl ethers of 2,2-bis-(4-hydroxyphenyl)-propane and polyglycidyl ethers of novolacs are particularly preferred.

Compounds which are suitable as component d) are those which contain groups which react with 1,2-epoxides. These are therefore predominantly compounds containing carboxylic acid and amino groups, or less preferably those containing thiol or hydroxyl groups. Hydroxyl groups may be converted into carboxylic acid groups in the manner described above, however. The compounds of component d) preferably contain at least one primary amino group, one secondary amino group, one hydroxyl group or one carboxylic acid group. In addition, these components may contain anionic groups such as neutralized carboxylate, sulphonate or phosphonate groups or cationic groups, such as ammonium groups for example, which can enhance the solubility, emulsifiability or dispersibility in water of the resins according to the invention. Examples of suitable compounds include hydroxyethyl-sulphonic acid, dimethylolpropionic acid or tartaric acid neutralized with alkali or organic bases, glycine, taurine= aminoethansulphonic acid, methyl taurine=2-methylaminoethansulfonic acid or amines such as N,N-dimethyl-N-(3-aminopropyl)amine and bis(N, N-dimethylaminopropyl)amine.

Examples of other compounds which are suitable as component d) include dicarboxylic acids such as succinic acid, adipic acid, suberic acid, azelaic acid, sebacic acid, phthalic acid, tetrahydrophthalic acid or hexahydrophthalic acid, fatty acids such as coconut oil fatty acid, lauric acid, myristic acid, palmitic acid, stearic acid, oleic acid, linoleic acid, tall oil fatty acids, and dimeric or trimeric fatty acids and fatty amines such as dodecylamine, tetradecylamine, hexadecylamine, octadecylamine or N-methyl octadecylamine.

Auxiliary processing materials may also be added to the resin according to the invention which prevent coagulation of the polymer particles present in dispersion and which can thereby enhance the stability of the dispersion. These auxiliary processing materials generally comprise so-called external emulsifying agents, and therefore comprise anionic, cationic or neutral, low molecular weight, oligomeric or polymeric emulsifying agents, surfactants or protective colloids, which may be contained in an amount from 0 to 10 weight %, preferably 0 to 5 weight %, based on the weight of the resin according to the invention. Resins which contain no external emulsifying agents are preferred, however.

Examples of anionic, low molecular weight, oligomeric or polymeric emulsifying agents or surfactants include alkali or alkaline earth salts of fatty acids, e.g. sodium salts of saturated fatty acids with 10 to 21 carbon atoms, sodium salts of unsaturated fatty acids with 12 to 18 carbon atoms, chlorosulphonated and saponified paraffin oils, alkyl ether sulphonates such as ethers of α-sulpho-ω-hydroxy-polyethylene glycols with nonyl phenol for example, or alkyl ethers with 12 to 18 carbon atoms, aryl alkylsulphonates, such as naphthalene sulphonic acid provided with straight-chain or branched butyl groups, for example, or alkyl sulphates such as the sodium salts of long chain sulphuric acid alkyl esters.

Examples of cationic, low molecular weight, oligomeric or polymeric emulsifying agents or surfactants include the salts of amines with 8 to 22 carbon atoms containing long chain alkyl radicals which have been reacted to form the ammonium compounds with acids or by alkylation, as well as analogous phosphorus and sulphur compounds.

Examples of nonionic, low molecular weight, oligomeric or polymeric emulsifying agents or surfactants include alkyl polyglycol ethers or esters such as ethoxylated long chain alcohols, e.g. with 12 to 18 carbon atoms, containing saturated or unsaturated bonds, e.g. ethoxylated castor oil, ethoxylated (coconut oil) fatty acids, ethoxylated soy bean oil, ethoxylated rosin acid or resinic acids, ethoxylated and optionally propoxylated butyl diglycol or ethoxylated alkyl aryl ethers such as ethoxylated straight-chain and/or branched nonyl phenol or octyl phenol or benzylated p-hydroxybiphenyl.

Other substances which are suitable as emulsifying agents or surfactants include ethoxylated long-chain alkyl or alkenyl amines, lecithin, reaction products of polyethylene glycols and diisocyanates which have been modified with long-chain alkyl isocyanates, reaction products of rape seed oil and diethanolamine, or ethoxylated reaction products of sorbitol and long-chain alkane or alkene carboxylic acids.

Examples of suitable protective colloids include polyvinyl alcohols or water-soluble cellulose derivatives such as methyl cellulose.

The resin according to the invention, which contains perfluoroalkyl groups and which is soluble, emulsifiable or dispersible in water, contains 5 to 95 weight % of oxyethylene units, calculated based on an equivalent weight of 44 g/mole oxyethylene unit, 1.5 to 60 weight % of fluorine, and optionally up to 200 milliequivalents of ionic groups per 100 g of resin. The equivalent ratio of the epoxide groups of component c) to the groups of components a), b) and d) which react with epoxide is between 1 to 5 and 5 to 1, preferably between 1 to 2 and 2 to 1.

The preparation of the resins according to the invention from components a) to d) is preferably effected by reacting component c), which contains 1,2-epoxide groups, with components a), b) and d) jointly or in successive reactions at temperatures between 60° and 200° C., preferably at temperatures from 80° to 150° C. The sequence of the reaction steps is unimportant in this procedure. The reaction is preferably conducted without the addition of solvents. However it is also possible to add solvents such as dimethylformamide, N-methyl pyrrolidone, dimethylacetamide, acetone, 2-butanone, tetrahydrofurane, methyl tert.-butyl ether, toluene, chloroform or dichloromethane during the reaction. These solvents may remain in the resin or may optionally be removed by suitable methods, for example by distillation, after the completion of the preparation. It is also possible to add agents which increase the reaction rate during the reactions such as quaternary ammonium salts like tetraethylammonium chloride and trimethyl benzylammonium chloride, basic alkali compounds such as sodium hydroxide, potassium hydroxide, potassium carbonate and sodium carbonate, or tertiary amines such as triethylamine, dimethyl benzylamine, dimethyl cyclohexylamine or bis(N, N-dimethylaminopropyl)formamide, for example. Operation under normal pressure is preferred; operation under elevated pressure may optionally also be employed. Moreover, the method necessitates no special process technology features. This also applies to the work-up stages.

The resins according to the invention which contain perfluoroalkyl groups and which are soluble, or emulsifiable or dispersible in water may be used as treatment-, protectiveand impregnating media for mineral materials such as masonry, concrete, calcareous sandstone, plaster, mortar, marble, ceramics, bricks and natural stone, e.g. as a water-repellent or an oil-repellent medium, for renovation or as an anti-graffiti coating, as a treatment medium for textile materials, leather and paper, e.g. for the waterproofing treatment or soiling resistance treatment of clothing, table linen and blinds, for the care and dirt-repellent treatment of carpets, carpeting and textile floor coverings, for the treatment and care of leather articles such as shoes, gloves and leather clothing, and as an emulsifying, crosslinking and auxiliary processing agent for the production of aqueous preparations, e.g. as emulsifying agents, flow promoters and thickeners.

The present invention is described in more detail with reference to the following examples.

EXAMPLE 1

50 g of a polyethylene glycol with an average molecular weight of 2000 g/mole were dehydrated in a three-necked flask fitted with an internal thermometer and a mechanical stirrer for 2 hours at 120° C. under a vacuum of 16 Torr. 5 g of succinic anhydride were added and the mixture was further stirred at a temperature of 100° C. until an acid number of 51 mg KOH/g material was obtained. After the addition of 68.25 g of a novolac polyglycidyl ether (Rft-tapox® 0300 manufactured by Bakelite, Duisburg) and 0.05 g sodium carbonate the mixture was stirred until an acid number could no longer be determined. 174.42 g of N-methyl perfluorooctane sulphonamide were added and the mixture was heated for a further 24 hours at 100° C. The final resin had an oxyethylene unit content of 16.8 weight % and a fluorine content of 36.9 weight %.

EXAMPLE 2

200 g of the polyethylene glycol from Example 1 and 20 g of succinic anhydride as in Example 1 were reacted in a three-necked flask fitted with an internal thermometer and a mechanical stirrer to form a polyether ester with an acid number of 53 mg KOH/g. 75 g of the polyether ester, 53.41 g of the novolac polyglycidyl ether from Example 1 and 0.5 g of sodium carbonate were then stirred at 100° C. in another three-necked flask fitted with an internal thermometer and a mechanical stirrer until an acid number could no longer be determined. 121.59 g of N-methyl perfluorooctane sulphonamide were then added, and the mixture was stirred for a further 24 hours at 120° C. The final resin had an oxyethylene unit content of 27.2 weight % and a fluorine content of 30.6 weight %.

EXAMPLE 3

75 g of the polyether ester from Example 2, 9.59 g of oleic acid, 68.25 g of the novolac polyglycidyl ether from Example 1 and 0.5 g of sodium carbonate were stirred at 100° C. in a three-necked flask fitted with an internal thermometer and a mechanical stirrer until an acid number could no longer be determined. 156.98 g of N-methyl perfluorooctane sulphonamide were then added, and the mixture was stirred for a further 24 hours at 120° C. The final resin had an oxyethylene unit content of 17.2 weight % and a fluorine content of 34.0 weight %.

EXAMPLE 4

55 g of the polyether ester from Example 2, 24.75 g of oleic acid, 68.25 g of the novolac polyglycidyl ether from Example 1 and 0.5 g of sodium carbonate were stirred at 100° C. in a three-necked flask fitted with an internal thermometer and a mechanical stirrer until an acid number could no longer be determined. 129.53 g of N-methyl perfluorooctane sulphonamide were then added, and the mixture was stirred for a further 24 hours at 120° C. The final resin had an oxyethylene unit content of 18.0 weight % and a fluorine content of 29.3 weight %.

EXAMPLE 5

55 g of the polyether ester from Example 2, 57.99 g of the novolac polyglycidyl ether from Example 1 and 0.5 g of sodium carbonate were stirred at 100° C. in a three-necked flask fitted with an internal thermometer and a mechanical stirrer until an acid number could no longer be determined. 150.76 g of N-methyl perfluorooctane sulphonamide were then added, and the mixture was stirred for a further 24 hours at 120° C. The final resin had an oxyethylene unit content of 15.0 weight % and a fluorine content of 37.9 weight %.

EXAMPLE 6

27.5 g of the polyether ester from Example 2, 60.62 g of the novolac polyglycidyl ether from Example 1 and 0.31 g of sodium carbonate were stirred at 100° C. in a three-necked flask fitted with an internal thermometer and a mechanical stirrer until an acid number could no longer be determined. 161.88 g of N-methyl perfluorooctane sulphonamide were then added, and the mixture was stirred for a further 24 hours at 100° C. The final resin had an oxyethylene unit content of 10.0 weight % and a fluorine content of 40.7 weight %.

EXAMPLE 7

13.75 g of the polyether ester from Example 2, 61.72 g of the novolac polyglycidyl ether from Example 1 and 0.31 g of sodium carbonate were stirred at 100° C. in a three-necked flask fitted with an internal thermometer and a mechanical stirrer until an acid number could no longer be determined. 174.53 g of N-methyl perfluorooctane sulphonamide were then added, and the mixture was stirred for a further 24 hours at 100° C. The final resin had an oxyethylene unit content of 5.0 weight % and a fluorine content of 43.9 weight %.

EXAMPLE 8

(dispersions of the resin according to the invention)

The resins of Examples 1 to 7 were each dissolved in twice the amount (based on their weight) of acetone. The amounts of water listed in the Table were subsequently added, with stirring. The acetone was subsequently distilled off at 30° C. down to a pressure of 16 mbar. Stable dispersions were obtained in all cases.

| Resin from Example | Water (g) | pH | Viscosity (mPa · s) | Stability | Solids content |
| --- | --- | --- | --- | --- | --- |
| 1 | 695 | 3.1 | 210 | >3 months | 30% |
| 2 | 1000 | 6.5 | 31 | >3 months | 20% |
| 3 | 870 | 5.9 | 30 | >3 months | 25% |
| 4 | 760 | 6.9 | 35 | >3 months | 25% |
| 5 | 750 | 6.2 | 112 | >3 months | 25% |
| 6 | 750 | 6.0 | 45 | >3 months | 25% |
| 7 | 750 | 6.8 | 12 | 1 month | 25% |

EXAMPLE 9

(use)

20 g of the dispersion of the resin from Example 3 were diluted with 480 g of water. Cotton fabric was impregnated with the diluted dispersion and subsequently dried at 25° C. and then for 1 hour at 110° C. in a drying oven. Drops of water and paraffin were then placed on the fabric. The drops remained standing on the fabric without wetting the fabric. By comparison with this result, water and paraffin immediately wet fabric which has not been impregnated, and are absorbed by the fabric.

It will be understood that the specification and examples are illustrative but not limitative of the present invention and that other embodiments within the spirit and scope of the invention will suggest themselves to those skilled in the art.

We claim:

1. A resin which contains perfluoroalkyl groups and which is soluble, emulsifiable or dispersible in water, identical with that prepared by reacting a) at least one sulphonamide containing a perfluoroalkyl group of the formula

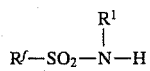

wherein $R^f$ represents a monovalent perfluoroalkyl group with 4 to 20 carbon atoms; and $R^1$ represents hydrogen or a monovalent hydrocarbon chain with 1 to 20 carbon atoms, optionally interrupted by 1 to 4 oxygen atoms, b) a component which contains oxyethylene units and which contains groups which react with 1,2-epoxides, c) a component which contains 1,2-epoxide groups, and d) optionally at least one additional component which contains a group which reacts with 1,2-epoxides, the oxyethylene units present in the resin constituting 5 to 95 weight % of the total resin.

2. A resin according to claim 1, comprising per 100 g of the resin about 5 to 95 g of the oxyethylene units, 1.5 to 60 g of fluorine and from 0 to about 200 milliequivalents of ionic groups.

3. A resin according to claim 1, wherein the equivalent ratio of the epoxide groups of component c) to the groups of components a), b) and d) which react with epoxide groups is between about 1 to 5 and 5 to 1.

4. A resin according to claim 1, wherein (b) is a polyoxyalkylene-modified polyester which contains oxyethylene units and acidic groups.

5. A resin according to claim 1, comprising per 100 g of the resin about 5 to 95 g of oxyethylene units, 1.5 to 60 g of fluorine and from 0 to about 200 milliequivalents of ionic groups, and the equivalent ratio, of the epoxide groups of component c) to the groups of components a), b) and d) which react with epoxide groups is between about 1 to 5 and 5 to 1.

6. An aqueous solution emulsion or dispersion of a resin according to claim 1.

7. In the treatment of a mineral material, textile material, leather or paper with an aqueous solution, emulsion or dispersion of a protecting agent, the improvement wherein said agent comprises a resin according to claim 1.

8. A resin according to claim 1, present as a protective surface on a mineral material, textile material, leather or paper.

* * * * *